US012780150B2

(12) United States Patent
Raju et al.

(10) Patent No.: US 12,780,150 B2
(45) Date of Patent: Nov. 3, 2026

(54) LOGIC TO EFFECTIVELY OPERATE CLEANING SYSTEM FOR LIDAR SENSOR OF AN AUTONOMOUS VEHICLE

(71) Applicant: GM Global Technology Operations LLC, Detroit, MI (US)

(72) Inventors: Kothamasi Sumithra Raju, Bangalore (IN); Julien P. Mourou, Bloomfield Hills, MI (US); Sudipto Ray, Bangalore (IN); Yuchuan Liu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1086 days.

(21) Appl. No.: 17/834,610

(22) Filed: Jun. 7, 2022

(65) Prior Publication Data

US 2023/0391291 A1 Dec. 7, 2023

(51) Int. Cl.
*B60S 1/08* (2006.01)
*B60W 60/00* (2020.01)

(52) U.S. Cl.
CPC ........... *B60S 1/0848* (2013.01); *B60S 1/0862* (2013.01); *B60W 60/001* (2020.02); *B60W 2420/408* (2024.01); *B60W 2555/20* (2020.02)

(58) Field of Classification Search
CPC ... B60S 1/0848; B60S 1/0862; B60W 60/001; B60W 2555/20; B60W 2420/408; G02B 27/0006
USPC .......................................................... 359/509
See application file for complete search history.

(56) References Cited

U.S. PATENT DOCUMENTS

2018/0354469 A1* 12/2018 Krishnan ........... G02B 27/0006
2019/0135239 A1* 5/2019 Rice .......................... B60S 1/52
2019/0256054 A1 8/2019 Turner et al.
2019/0322245 A1* 10/2019 Kline .................... B60S 1/0848
2019/0351464 A1* 11/2019 Kim ........................ G01S 7/497
2020/0292679 A1* 9/2020 Osiroff .................. G01S 7/4815
2021/0088668 A1* 3/2021 Hahn .................... G01S 7/4813
2021/0362687 A1* 11/2021 Safira .................... G01S 7/4813
2022/0063568 A1* 3/2022 Gilbertson ............ G01S 7/4004
2022/0128672 A1* 4/2022 Kim ........................ B60S 1/486
2022/0168789 A1* 6/2022 Philipp ...................... B60S 1/56
2023/0366997 A1* 11/2023 Raju ......................... B05B 1/08
(Continued)

FOREIGN PATENT DOCUMENTS

JP 2003024758 A 1/2003
JP 2004333962 A 11/2004
WO 03016112 A2 2/2003

OTHER PUBLICATIONS

Chinese Office Action for Chinese Application No. 202211349454.0; dated Mar. 23, 2026; 13 pages.

*Primary Examiner* — Jennifer D. Carruth
(74) *Attorney, Agent, or Firm* — CANTOR COLBURN LLP

(57) ABSTRACT

A Lidar system, a cleaning apparatus for the Lidar system and a method of operation. The cleaning apparatus cleans a surface of the Lidar system. The cleaning apparatus includes a nozzle and a processor. The nozzle discharges a gas at a surface of the Lidar system. The processor is configured to identify a type of debris on the surface, identify a cleaning mode for cleaning the surface based on the type of debris, select a nozzle velocity of the gas from the nozzle based on the cleaning mode, and operate the nozzle to discharge the gas at the nozzle velocity.

20 Claims, 3 Drawing Sheets

(56) References Cited

U.S. PATENT DOCUMENTS

| | | | | |
|---|---|---|---|---|
| 2024/0295641 | A1* | 9/2024 | Fang | G01S 7/497 |
| 2024/0416872 | A1* | 12/2024 | Bertolina | B60R 11/04 |

* cited by examiner

LOGIC TO EFFECTIVELY OPERATE CLEANING SYSTEM FOR LIDAR SENSOR OF AN AUTONOMOUS VEHICLE

INTRODUCTION

The subject disclosure relates to Lidar systems used in vehicles and, in particular, to a method for cleaning a window of the Lidar system based on environmental conditions.

Lidar (Light Detection and Ranging) systems can be used as detection systems in autonomous vehicles. In Lidar, a laser beam is transmitted into the environment and a reflection of the laser beam off of objects in the environment is received and recorded. The Lidar system generally is housed in a protective housing having a transparent window through which the laser beam and its reflection can pass. This window can accumulate debris or fluid on it under certain conditions, which deflects the laser beams and therefore impairs the operation of the Lidar system. Accordingly, it is desirable to provide a system and method for cleaning the fluid from the window as quickly as possible.

SUMMARY

In one exemplary embodiment, a method operating of a Lidar system is disclosed. A type of debris on a surface of the Lidar system is identified. A cleaning mode for cleaning the surface based on the type of debris is identified. A gas is discharged from a nozzle at the surface at a nozzle velocity to clean the surface. The nozzle velocity is selected based on the cleaning mode.

In addition to one or more of the features described herein, the nozzle velocity is related to a value of a skin friction coefficient at the surface and the nozzle velocity is selected to create the value for the skin friction coefficient according to the cleaning mode. The method further includes dispensing a cleaning fluid onto the surface and discharging the gas from the nozzle after the cleaning fluid has been dispensed. The method further includes obtaining an image of the surface and identifying the type of debris from the image. The method further includes obtaining an image of the surface and determining a level of cleanliness of the surface of the based on the image. The nozzle velocity for the mode is selected to perform at least one of removing the debris from the surface, moving the debris along the surface, and maintaining a cleanliness of the surface. The surface is a window through which light of the Lidar system passes.

In another exemplary embodiment, a cleaning apparatus for a Lidar system is disclosed. The cleaning apparatus includes a nozzle and a processor. The nozzle discharges a gas at a surface of the Lidar system. The processor is configured to identify a type of debris on the surface, identify a cleaning mode for cleaning the surface based on the type of debris, select a nozzle velocity of the gas from the nozzle based on the cleaning mode, and operate the nozzle to discharge the gas at the nozzle velocity.

In addition to one or more of the features described herein, the nozzle velocity is related to a value of a skin friction coefficient at the surface and the processor is further configured to select the nozzle velocity to create the value for the skin friction coefficient according to the cleaning mode. The cleaning apparatus further includes a fluid dispenser configured to dispense a cleaning fluid onto the surface, wherein the processor is further configured to discharge the gas after the cleaning fluid has been dispensed. The cleaning apparatus further includes an imaging device for obtaining an image of the surface, wherein the processor is further configured to identify the type of debris from the image. The cleaning apparatus further includes an imaging device for obtaining an image of the surface, wherein the processor is further configured to determine a level of cleanliness of the surface from the image. The nozzle velocity for the mode is selected to perform at least one of removing the debris from the surface, moving the debris along the surface, and maintaining a cleanliness of the surface. The surface is a window through which light of the Lidar system passes.

In yet another exemplary embodiment, a Lidar system is disclosed. The Lidar system includes a cleaning apparatus for cleaning a surface of the Lidar system. The cleaning apparatus includes a nozzle and a processor. The nozzle discharges a gas at the surface. The processor is configured to identify a type of debris on the surface, identify a cleaning mode for cleaning the surface based on the type of debris, select a nozzle velocity of the gas from the nozzle based on the cleaning mode, and operate the nozzle to discharge the gas at the nozzle velocity.

In addition to one or more of the features described herein, the nozzle velocity is related to a value of a skin friction coefficient at the surface and the processor is further configured to select the nozzle velocity to obtain the value for the skin friction coefficient according to the cleaning mode. The Lidar system further includes a fluid dispenser configured to dispense a cleaning fluid onto the surface, wherein the processor is further configured to discharge the gas after the cleaning fluid has been dispensed. The Lidar system further includes an imaging device for obtaining an image of the surface, wherein the processor is further configured to determine a level of cleanliness of the surface of the based on the image. The nozzle velocity for the mode is selected to perform at least one of removing the debris from the surface, moving the debris along the surface, and maintaining a cleanliness of the surface. The surface is a window through which light of the Lidar system passes.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
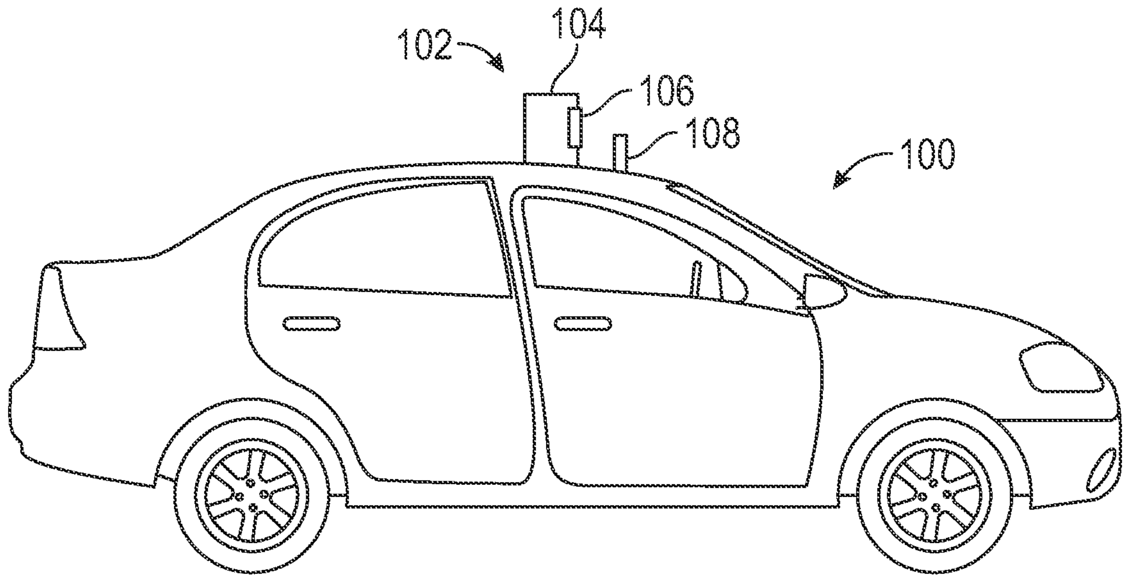
FIG. 1 shows a vehicle having a Lidar system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100 having a Lidar system 102. The Lidar system 102 includes a housing 104 and a window 106. The housing 104 houses various electrical components of the Lidar system 102 to protect them from the environment. The electrical components of the Lidar system 102 can include a light source, such as a laser, and a light-sensitive sensor. The window 106 is transparent or semi-transparent in a region of the electromagnetic spectrum surrounding the wavelength of the laser. A light beam generated at the light source passes through the window 106 to interact with objects in the environment. A reflection of the light beam off of objects in the environment can pass through the window 106 to enter into the housing 104 and be detected at the sensor. Debris, such as rain, dirt, dust, etc., can deposit onto an outer surface of the window 106, affecting the light beams and therefore impairing operation of the Lidar system 102. The vehicle 100 includes a cleaning apparatus 108 that cleans the debris from the window 106.

Figure 2:
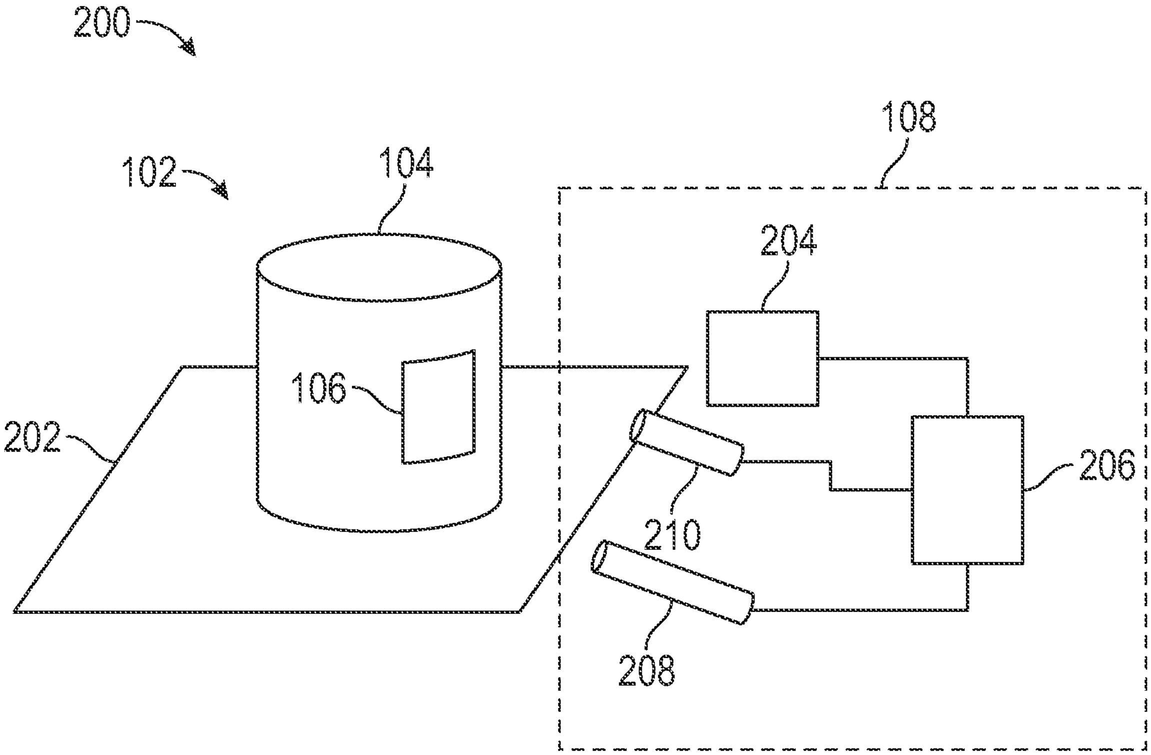
FIG. 2 shows a schematic diagram of the Lidar system and an associated cleaning apparatus, in an illustrative embodiment.

FIG. 2 shows a schematic diagram 200 of the Lidar system 102 and cleaning apparatus 108, in an illustrative embodiment. The cleaning apparatus 108 includes a camera or imaging device 204, a processor 206 and a nozzle 208. The nozzle 208 discharges a gas at the window 106 for the purpose of cleaning the window 106. In various embodiments, the nozzle 208 includes a plurality of nozzles. The cleaning apparatus 108 can also include a fluid dispenser 210 for dispensing cleaning fluid onto the window 106. The imaging device 204 and the processor 206 can be used as a debris detection device. The imaging device 204 obtains an image of the window 106. The image is sent to the processor 206, which determines a level of debris accumulated on the window 106. The processor 206 can then select a cleaning mode and operate the nozzle 208 and/or the fluid dispenser 210 based on the selected cleaning mode.

The nozzle 208 is pointed at the window 106 of the Lidar system 102 and discharges the gas at the window 106 upon receiving a signal from the processor 206. The gas can be air, in various embodiments. The processor 206 can control the operation of the nozzle 208 based on the cleaning mode. For example, the processor 206 can control the nozzle velocity of the gas from the nozzle 208, a pulse waveform of the gas, and a value of a skin friction coefficient (SFC) created at the window 106. The SFC along a window 106 is a resistant force at the surface of the window 106 exerted by a fluid or gas moving with respect to the window and is related to a velocity of the cleaning gas at the window. The relation between nozzle velocity and skin friction coefficient can be calculated based on the dimensions of the nozzle 206 and the location of the nozzle with respect to the window 106, which are either known or controllable parameters. The skin friction coefficient can be calculated as shown in Eq. (1):

$$C_f = \frac{\tau_w}{\frac{1}{2}\rho v^2} \quad \text{Eq. (1)}$$

where $C_f$ is the skin friction coefficient, ρ is the density of the fluid or cleaning gas, ν is the free stream speed or gas velocity (i.e., the fluid speed at a distance frame from the window's surface), and $\tau_w$ is a skin shear stress at the window's surface. The denominator ($1/2\rho v^2$) is known as the dynamic pressure of the free stream. The higher the SFC, the greater the velocity of gas at the window 106 and the higher level of cleanliness resulting at the window 106. Therefore, the SFC that is needed to clean a window 106 can be used to select the nozzle velocity for the gas. The resistant force needed to clean the window 106 can be determined based on a type of debris on the window, a desired level of cleanliness of the window, and an amount of accumulation of the debris that needs to be cleared from the surface.

Figure 3:
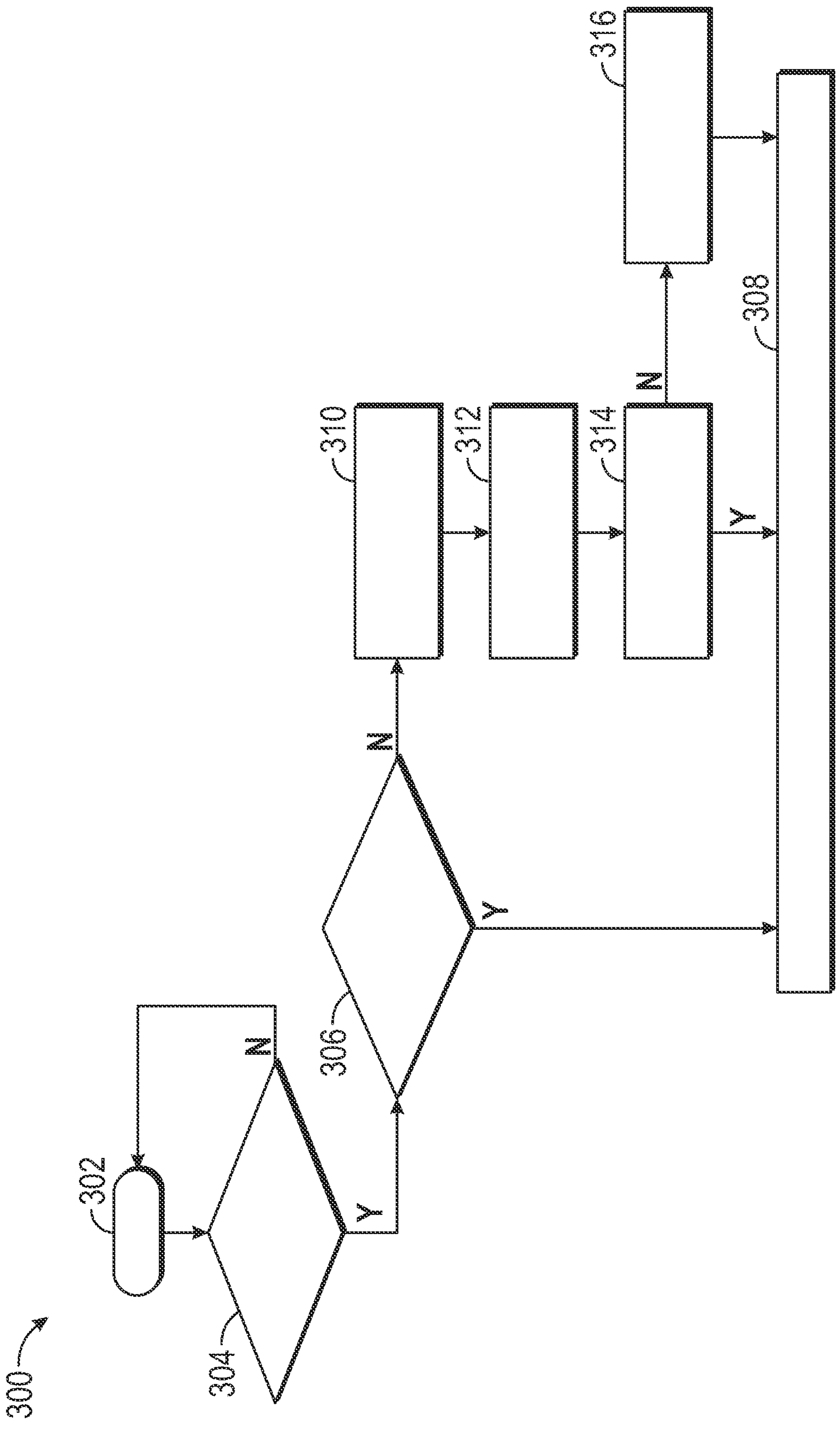
FIG. 3 shows a flowchart of a method for monitoring a surface of a Lidar system and activating a cleaning of the surface.

FIG. 3 shows a flowchart 300 of a method for monitoring a surface of a Lidar system 102 (such as window 106) and activating the cleaning apparatus 108 to clean the surface. The method starts at box 302. At box 304, the method determines whether the vehicle 100 is being driven or is operational. If the vehicle 100 is not being driven, the method loops back to box 302. If the vehicle 100 is being driven, the method proceeds to box 306.

In box 306, the method detects an environmental condition (i.e., whether the environment is clear or if there is rain, mud, or snow in the environment). The environmental condition can be detected using weather data from various sources or environmental sensors on the vehicle 100. If the environmental condition is clear, the method proceeds to box 308 in which the process ends. If the environmental condition is not clear (e.g., rain, mud and/or snow is detected in the environment), the method proceeds to box 310. In box 310, the imaging device 204 is activated to monitor the window 106 of the Lidar system 102. Monitoring includes performing debris detection at the window 106. In box 312, data from the imaging device 204 is reviewed at the processor 206 to identify a level of cleanliness of the window 106. In box 314, if the cleanliness of the surface is at or above a cleanliness threshold, then the method proceeds to box 308, where the method ends. If instead the cleanliness of the surface is below the selected threshold, then the method proceeds to box 316. In various embodiments, the cleanliness threshold is "99% clean", which is a threshold in which no debris (e.g., droplet, mud) is detected in an image of the window 106. In box 316, the cleaning system is activated in a selected cleaning mode.

Figure 4:
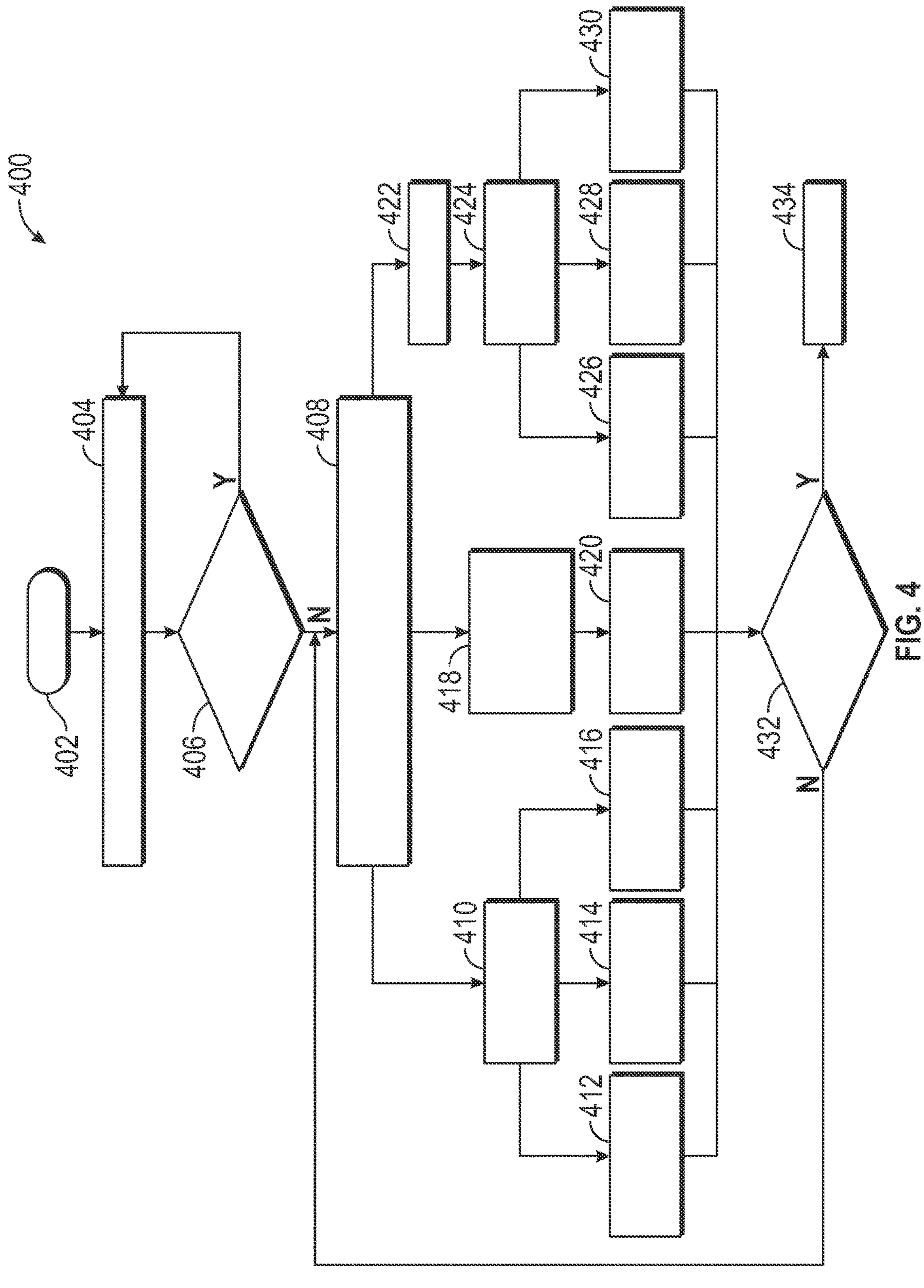
FIG. 4 shows a flowchart of a method for cleaning the surface of the Lidar system.

FIG. 4 shows a flowchart 400 of a method for cleaning the surface of the Lidar system. The method starts at box 402. In box 404, the cleaning system enters into a default cleaning mode. The default mode is a 'stay clean' mode. In one embodiment, the 'stay clean' mode includes discharging gas from the nozzle at a nozzle velocity that generates an SFC>=3 at the window 106. In box 406, the processor 206 determines whether the cleaning system is to remain in the default mode. The cleaning system 108 can change modes if any debris is located in the environment. If the cleaning system 108 is to remain in the default mode, the method loops back to box 404. If the cleaning system is to operate using a different mode, the method proceeds to box 408.

In box 408, the processor 206 identifies the type of debris on the window 106. The type of debris can be determined using data or an image obtained at the imaging device 204. In the illustrative embodiment, the type of debris is at least one of rain, dust, or mud. However, other types of debris can be included in various embodiments. From box 408, if the debris is rain, the method proceeds to box 410. If the debris is dust, the method proceeds to box 418. If the debris is mud or some other type, the method proceeds to box 422.

Referring to box 410, the processor 206 enters a rain cleaning mode and determines an action to be taken in the rain cleaning mode. For example, the processor 206 determine whether the window 106 needs only to be kept clean (i.e., little or no accumulation of rain droplets), whether rain droplets on the window 106 are to be moved to one side of the window 106 or if rain droplets are to be removed entirely from the window. If the window 106 needs only to be kept clean, the method proceeds to box 412. In box 412, a 'stay clean' action occurs in which the cleaning gas is discharged from the nozzle 208 at a nozzle velocity that provides a skin friction coefficient less than 3. Returning to box 410, if the selected action is to move rain along the window surface, the method proceeds to box 414. In box 414, the cleaning gas is discharged from the nozzle 208 at a nozzle velocity that provides a skin friction coefficient of greater than or equal to 3 and less than 20 (3<=SFC<20). Returning again to box 410, if the selected action is to remove the rain from the window 106, the method proceeds to box 416. In box 416, the cleaning gas is discharged from the nozzle 208 at a nozzle velocity that provides a skin friction coefficient of greater than or equal to 20 (SFC>=20).

Referring now to box 418, the cleaning system 108 enters a dust removal mode. In box 420, the processor 206 performs a 'stay clean' action in which cleaning gas is discharged from the nozzle 208 at a nozzle velocity that provides a skin friction coefficient of less than or equal to 3 (SFC<=3).

Referring now to box 422, a cleaning fluid is discharged from the fluid dispenser 210 onto the window 106. In box 424, the cleaning system 108 enters into a mud cleaning mode and determines an action to be taken in the mud cleaning mode. If the window 106 needs only to be kept clean, the method proceeds to box 426. In box 426, the cleaning gas is discharged from the nozzle 208 at a nozzle velocity the provides a skin friction coefficient that is less than 3 (SFC<3). Returning to box 424, if a mud moving action is selected, the method proceeds to box 428. In box 428, the cleaning gas is discharged from the nozzle 208 at a nozzle velocity that provides a skin friction coefficient that is greater than or equal to 3 and less than 20 (3<=SFC<20). Returning again to box 424, if a mud removal action is selected, the method proceeds to box 430. In box 430, the cleaning gas is discharged from the nozzle 208 at a nozzle velocity that provides a skin friction coefficient of greater than or equal to 20 (SFC>=20).

From either of boxes 412, 414, 416, 420, 426, 428 and 430, once the cleaning gas has been discharged according to its corresponding action, the method proceeds to box 432. In box 432, the window 106 is inspected by the debris detection system. If the cleanliness of the window 106 is greater than a selected cleanliness threshold (e.g., ">99% clean"), the method proceeds to box 434, in which the method ends. If the cleanliness of the window 106 is less than the selected cleanliness threshold, the method proceeds to box 408 to repeat the method to produce additional cleaning.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method operating of a Lidar system, comprising:

identifying a type of debris on a surface of the Lidar system;

identifying a cleaning mode for cleaning the surface based on the type of debris;

determining an action to be taken for the cleaning mode, the action including one of: (i) discharging a gas from a nozzle at a nozzle velocity that creates a skin friction coefficient at the surface of less than 3; (ii) discharging the gas from the nozzle at the nozzle velocity that creates the skin friction coefficient at the surface between 3 and 20; and (iii) discharging the gas from the nozzle at the nozzle velocity that creates the skin friction coefficient at the surface greater than 20; and discharging the gas from the nozzle at the nozzle velocity.

2. The method of claim 1, further comprising activating an imaging device to detect the type of debris at the surface when an environmental sensor detects weather data that indicates that an environment condition is not clear.

3. The method of claim 1, further comprising dispensing a cleaning fluid onto the surface when the type of debris is identified as mud and discharging the gas from the nozzle after the cleaning fluid has been dispensed.

4. The method of claim 2, further comprising obtaining an image of the surface via the imaging device and identifying the type of debris from the image.

5. The method of claim 4, further comprising determining a level of cleanliness of the surface based on the image.

6. The method of claim 1, wherein the nozzle velocity for the mode is selected to perform at least one of: (i) creating the skin friction coefficient greater than 20 to remove the debris from the surface; (ii) creating the skin friction coefficient between 3 and 20 to move the debris along the surface; and (iii) creating the skin friction coefficient less than 3 to maintain a cleanliness of the surface.

7. The method of claim 1, wherein the surface is a window through which light of the Lidar system passes.

8. A cleaning apparatus for a Lidar system, comprising:

a nozzle for discharging a cleaning gas at a surface of the Lidar system; and a processor configured to:

identify a type of debris on the surface;

identify a cleaning mode for cleaning the surface based on the type of debris;

determine an action to be taken for the cleaning mode, the action including one of: (i) discharging the cleaning gas from the nozzle at a nozzle velocity that creates a skin friction coefficient at the surface of less than 3; (ii) discharging the cleaning gas from the nozzle at the nozzle velocity that creates the skin friction coefficient at the surface between 3 and 20; and (iii) discharging the cleaning gas from the nozzle at the nozzle velocity that creates the skin friction coefficient at the surface greater than 20; and operate the nozzle to discharge the cleaning gas at the nozzle velocity.

9. The cleaning apparatus of claim 8, further comprising an imaging device for detecting the type of debris at the surface and an environmental sensor for detecting weather data, wherein the imaging device is activated when the weather data indicates that an environment condition is not clear.

10. The cleaning apparatus of claim 8, further comprising a fluid dispenser configured to dispense a cleaning fluid onto the surface when the type of debris is identified as mud, wherein the processor is further configured to discharge the cleaning gas after the cleaning fluid has been dispensed.

11. The cleaning apparatus of claim 9, wherein the processor is further configured to identify the type of debris from an image.

12. The cleaning apparatus of claim 11, wherein the processor is further configured to determine a level of cleanliness of the surface from the image.

13. The cleaning apparatus of claim 8, wherein the nozzle velocity for the mode is selected to perform at least one of:

(i) creating the skin friction coefficient greater than 20 to remove the debris from the surface; (ii) creating the skin friction coefficient between 3 and 20 to move the debris along the surface; and (iii) creating the skin friction coefficient less than 3 to maintain a cleanliness of the surface.

14. The cleaning apparatus of claim 8, wherein the surface is a window through which light of the Lidar system passes.

15. A Lidar system, comprising:

a cleaning apparatus for cleaning a surface of the Lidar system, the cleaning apparatus comprising:

a nozzle for discharging a cleaning gas at the surface; and a processor configured to:

identify a type of debris on the surface;

identify a cleaning mode for cleaning the surface based on the type of debris;

determine an action to be taken for the cleaning mode, the action including one of: (i) discharging the cleaning gas from the nozzle at a nozzle velocity that creates a skin friction coefficient at the surface of less than 3; (ii) discharging the cleaning gas from the nozzle at the nozzle velocity that creates the skin friction coefficient at the surface between 3 and 20; and (iii) discharging the cleaning gas from the nozzle at the nozzle velocity that creates the skin friction coefficient at the surface greater than 20; and operate the nozzle to discharge the cleaning gas at the nozzle velocity.

16. The Lidar system of claim 15, wherein the cleaning apparatus further comprises an imaging device for detecting the type of debris at the surface and an environmental sensor for detecting weather data, wherein the imaging device is activated when the weather data indicates that an environment condition is not clear.

17. The Lidar system of claim 15, further comprising a fluid dispenser configured to dispense a cleaning fluid onto the surface when the type of debris is identified as mud, wherein the processor is further configured to discharge the cleaning gas after the cleaning fluid has been dispensed.

18. The Lidar system of claim 15, further comprising an imaging device for obtaining an image of the surface, wherein the processor is further configured to determine a level of cleanliness of the surface based on the image.

19. The Lidar system of claim 15, wherein the nozzle velocity for the mode is selected to perform at least one of: (i) creating the skin friction coefficient greater than 20 to remove the debris from the surface; (ii) creating the skin friction coefficient between 3 and 20 to move the debris along the surface; and (iii) creating the skin friction coefficient less than 3 to maintain a cleanliness of the surface.

20. The Lidar system of claim 15, wherein the surface is a window through which light of the Lidar system passes.

* * * * *